Oct. 13, 1959   J. E. HUDSON   2,908,855
ELECTRIC VALVE CONTROL CIRCUIT
Filed Feb. 24, 1956   3 Sheets-Sheet 1
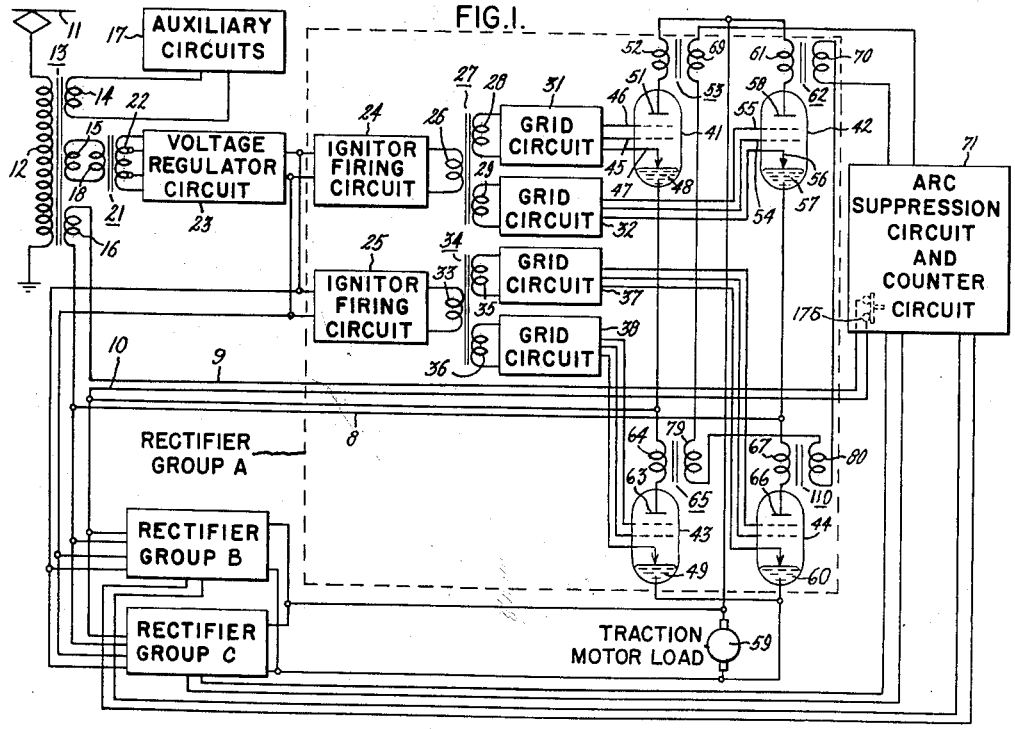
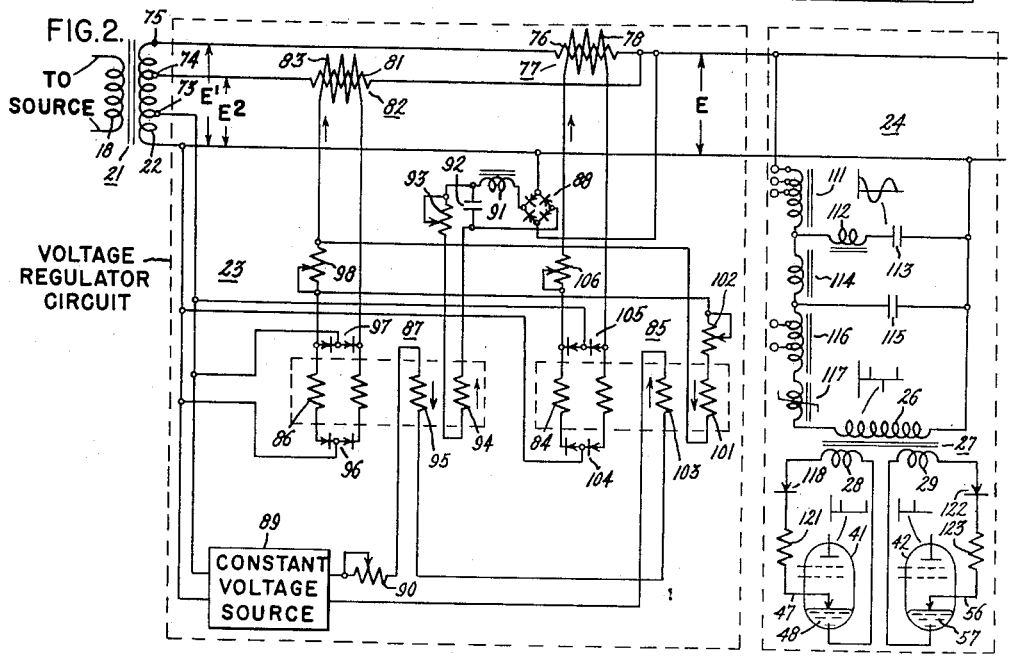
INVENTOR:
JAMES E. HUDSON,
BY *Nathan J. Cornfeld*
HIS ATTORNEY.

Oct. 13, 1959  J. E. HUDSON  2,908,855
ELECTRIC VALVE CONTROL CIRCUIT
Filed Feb. 24, 1956  3 Sheets-Sheet 2

INVENTOR:
JAMES E. HUDSON,
BY *Nathan Somfeld*
HIS ATTORNEY.

Oct. 13, 1959

J. E. HUDSON 2,908,855

ELECTRIC VALVE CONTROL CIRCUIT

Filed Feb. 24, 1956

INVENTOR:
JAMES E. HUDSON,
BY *Nathan J. Cornfeld*
HIS ATTORNEY.

United States Patent Office 2,908,855
Patented Oct. 13, 1959

2,908,855
ELECTRIC VALVE CONTROL CIRCUIT

James E. Hudson, Schenectady, N.Y., assignor to General Electric Company, a corporation of New York Application February 24, 1956, Serial No. 567,659

15 Claims. (Cl. 321—13)

My invention relates to electric valve control circuits and more particularly to control circuits for electric valves of the ionizable-medium or ignitron type provided with immersion ignitors.

In the operation of rectifying circuits which employ electric valves of the ignitron type, a cathode spot is required to act as the source of electron emission and is intended to be formed every half cycle on the cathode of the electric valves. An undesirable situation arises in the event the ignitor fails to fire and form the cathode spot, for example, because the firing voltage has dropped in amplitude or because of drift in ignitor firing characteristics. If for any reason the cathode spot fails to form, and under these conditions the anode has a positive potential and the control grid is made positive the residual ionization in the valve may form a cathode spot, by bombardment, on the sidewalls or other equally undesirable locations within the valve envelope. It is therefore necessary to insure that the firing voltage is maintained at a predetermined amplitude and that the grids maintain a negative bias and become positive only upon the formation of a cathode spot.

Ignitrons are susceptible to fault currents resulting from a prolonged arc-back, that is, a situation when current in the ignitron is flowing in a reverse direction, and which may destroy the ignitron. Therefore, arc suppression circuitry should be included to protect against such fault currents.

Should the ignitron, for any reason, misfire, it is desirable to obtain an indication of such misfire, and it is convenient that such misfires be readily detectable by observation.

Accordingly, it is a principal object of my invention to provide new and improved control circuitry for rectifying systems employing ignitron type valves in which a voltage regulator, an interlocking grid circuit and an arc suppression circuit are provided.

It is another object of my invention to provide a new and improved arc-back counter circuit arrangement useful in the control circuits of the type contemplated.

In accordance with my invention, I provide a novel arrangement of control circuitry for a rectifying system which includes saturable reactor circuits controlled by amplistat reactors to obtain a regulated voltage for ignitron control circuits together with ignitron control circuits which insure that a cathode spot is formed by the ignitron prior to the time the grid electrodes in said ignitrons become positive, circuitry for suppressing excessive arc-back currents, as well as circuits to operate a counter of arc-back occurrences, and circuits for indicating misfiring of the ignitrons.

Other objects and advantages will become apparent after a consideration of the specification and the drawings wherein like elements in each of the several figures are identified by the same reference character, and in which:

Figure 1 is a block diagram of the rectifying system of my invention;

Figure 2 is a schematic diagram of the voltage regulator circuit and an ignitor firing circuit of Figure 1;

The rectifying system of the present invention is usable in a power rectifier apparatus which rectifies power from an alternating current system to a direct current system; and in one specific application is used to accomplish such rectification, from a single phase 25 cycle high-voltage alternating current trolley to direct current for traction motor loads of a railway locomotive installation. In such an applicaiton, the rectifier uses a total of twelve ignitron tubes; the tubes being mounted in three groups of four ignitron tubes each. The ignitrons are coupled so as to provide full wave rectification having two valves in each group conducting during alternate parts of the cycle.

In the system of Figure 1, the rectifier groups are designated as rectifier groups A, B and C respectively. Since groups A, B and C are identical in construction and operation, only one such group is here shown in detail, the other two being represented by suitably labeled blocks.

Figure 3:
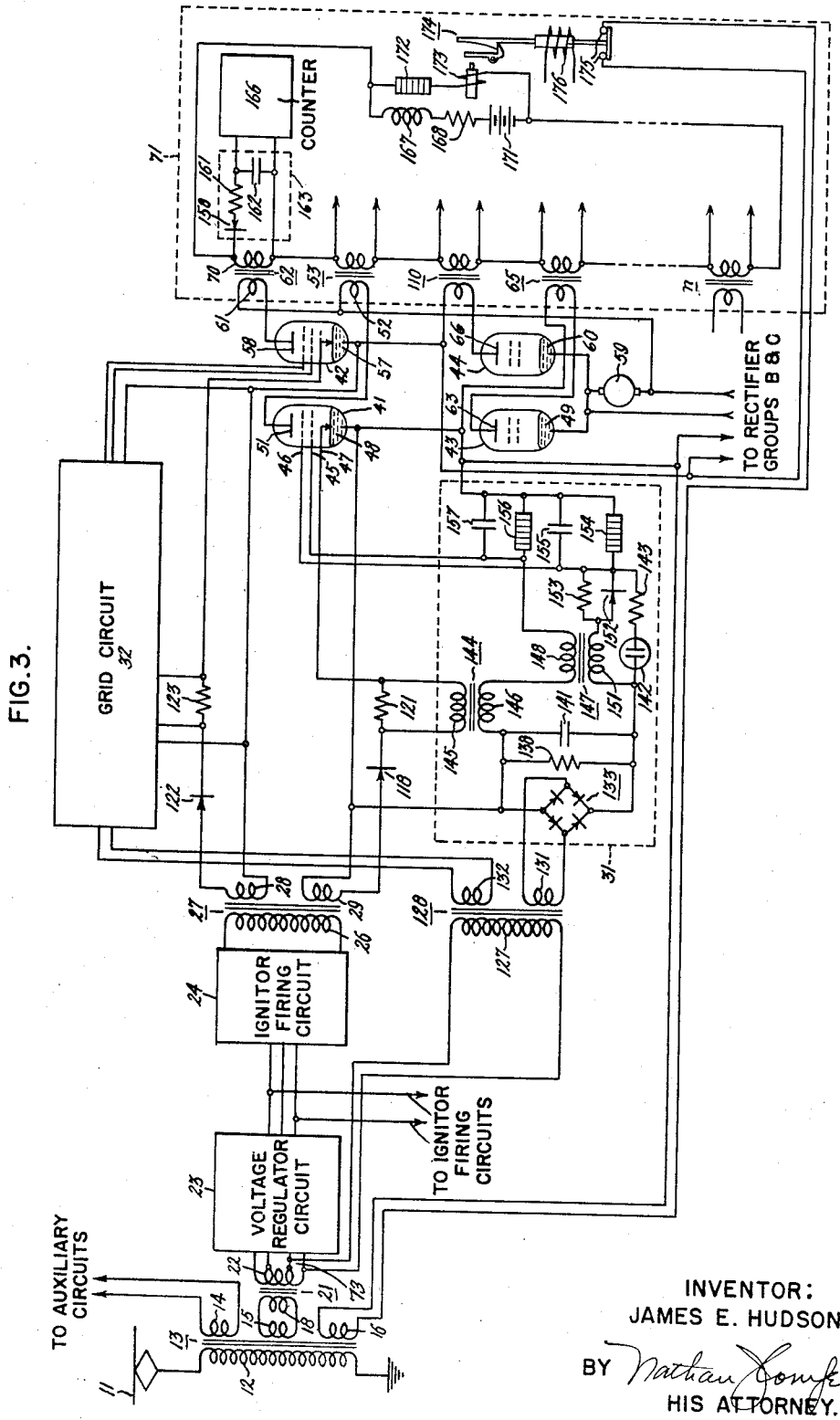
Figure 3 is a schematic diagram of the grid circuit, the arc suppression circuit, and the counter circuit of Figure 1.

The alternating current power to the rectifier is coupled from a single phase 25 cycle bus 11 through a transformer 12 having secondary windings 14, 15 and 16 to the rectifying valves and thence to the load 59. The power to be rectified is taken from across secondary 16, while the control circuitry for the rectifying valves is energized from secondary 15. Secondary 14 couples to auxiliary circuits 17 consisting of auxiliary motors of sundry types which are not, per se, a part of this invention and which will therefore not be discussed further. The voltage appearing at the secondary winding 15 is coupled through the isolation transformer 21 to the input of a voltage regulator circuit 23 and thence to the rest of the control circuitry, the details of which will be discussed subsequently. The regulated output of circuit 23 is coupled to ignitor firing circuits 24 and 25 of rectifier group A and also to the corresponding ignitor firing circuits of the rectifier groups B and C. Ignitor firing circuits 24 and 25, as will be discussed in detail subsequently, operate to transform the sinusoidal waveform fed thereto into a pulsed output suitable to energize the grid circuits. The output of ignitor firing circuit 24 is coupled through transformer 27 to grid circuits 31 and 32. Similarly the output of ignitor firing circuit 25 is coupled through transformer 34 to grid circuits 37 and 38. As will be described in detail hereinbelow, the grid circuits 31, 32, 37 and 38 operate to ensure the application of positive voltage to the control grids of the ignitrons only upon the formation of a cathode spot on the liquid electrode of the ignitron. The output of grid circuit 31 is applied to screen grid 45, control grid 46 and ignitors 47 of ignitron 41. In a similar manner the grid circuits 32, 37 and 38 are applied to the corresponding electrodes of ignitrons 42, 44 and 43, respectively. It will be apparent from the description that follows that these connections are such as to ensure the desired timed relationship between the application of positive voltage to the grid of the ignitron and the formation of a cathode spot. The details of the circuits for accomplishing this operation are shown in Figure 3 and the circuits will be subsequently fully discussed.

Anodes 51 and 58 of ignitrons 41 and 42 are coupled through primaries 52 and 61 of current transformers 53 and 62 respectively, to one terminal of load 59. Anode 63 of ignitron 43 is coupled to cathode 48 of ignitron 41 through primary winding 64 of transformer 65. Similarly, anode 66 of ignitron 44 is coupled to cathode 57 of ignitron 42 through primary winding 67 of transformer 110. Cathodes 49 and 60 of ignitrons 43 and 44 respectively, are coupled together and to the other terminal of load 59. Ignitrons 41 and 44 conduct for approximately one half of a cycle and ignitrons 42 and 43 conduct on the alternate part of the cycle to provide full wave rectification.

Secondary windings 69, 70, 79 and 80 of current transformers 53, 62, 65 and 110 respectively, coupled serially to arc suppression circuit 71 to provide a means for energizing circuit 71. Circuit 71 includes a relay having two point contacts 175 which are normally closed corresponding to a condition of no arc back. The operation of the relay will be discussed hereinbelow. One of the contact points 175 of the relay is coupled to one terminal of winding 16 through lead 9 and the other contact point 175 connects through lead 10 to the junction between the serially coupled anodes and cathodes of the ignitrons in each rectifier group corresponding to anode 63 and cathode 48 of ignitrons 43 and 41 of group A respectively. The other terminal of winding 16 is coupled through lead 8 to the junction between the serially connected anodes and cathodes of the ignitrons in each rectifier group corresponding to anode 66 and cathode 57 of ignitrons 44 and 42 of group A respectively.

Since the particular details of the arrangement of the valves form no part of my invention, it is believed sufficient for an understanding of the invention to describe in detail the control circuits for one valve pair of rectifier group A.

Low voltage ignitrons may have only the essential elements of anode-cathode, and ignitor; the structure of low voltage tubes being relatively open so that anode current may be started by firing the ignitor. Ignitron tubes made for high voltage, high current applications, such as needed for the rectifying system of the present invention, require a modification of the simple internal structure to obtain reliable operation at rated load. The type of valve employed in the embodiments of the invention may be classified as a tetrode ignition by reason of the use of a control electrode and a shield electrode in addition to the other two principal electrodes. The valves in these three groups are all of the same type therefore only valve 41 will be described in detail. Valve 41 includes anode 51, a control electrode 46 which determines the time of starting and reduces the deionization period at the end of conduction, a shield electrode 45, mercury pool cathode 48, and immersion ignitor 47. Control electrode 46 is a perforated structure surrounding the anode 51. The shield grid 45 is placed between the control grid 46 and the cathode 48 and surrounds the control grid 46. A negative bias may initially be applied to both grids 45 and 46 or only to the control grid 46. In one embodiment the shield grid 45 has a positive voltage applied at the time ignitor current begins to flow. When a cathode spot is formed by the ignitor 47, current begins to flow from the shield grid 45 to the cathode 48. By removing bias from the control grid 46, and applying to it a positive potential after the shield grid 45 begins to conduct, the electrons can reach the anode 51 which is at a positive potential, and anode current begins. Once the anode current has begun to flow, any change of grid voltage or ignitor current cannot have any effect on its magnitude or duration; only a decrease in anode-to-cathode voltage below the arc-drop volts necessary to sustain ionization can stop conduction. Presence of a negatively biased grid 46 helps to increase the voltage from cathode to anode which the tube can withstand without arcing back, that is, without conducting in a reverse direction.

Under certain abnormal conditions, an ignitron tube, say 41, may conduct current while the anode 51 is negative with respect to the cathode 48. Excessive temperature or presence of impurities at the anode 51 may cause emission of enough electrons to provide for a reverse flow of current or arc-back. A tube which arcs back is in effect a short circuit in the rectifier circuit and the fault, or reverse current must be interrupted as soon as possible to prevent permanent damage to the ignitrons as well as to the rectifier components.

Another undesirable condition occurs when current flows from anode 51 to cathode 48 before the ignitor 47 has developed a spot on the cathode of ignitron 41. This condition is termed as arc-through and is more likely to occur if the control or inner grid 46 is allowed to become positive while the anode 51 is positive and prior to the time the cathode spot is developed.

In accordance with my invention, I make the grid positive dependent upon the controlled formation of a cathode spot. The means of accomplishing this interlocking or coupling is described in detail hereinbelow.

In Figure 2, voltage regulator 23 consists of two saturable reactors 77 and 82, which are coupled in series with the utilizing circuits consisting of the ignitor firing circuits in the various rectifier groups, and two amplistat reactors 85 and 87 coupled to control the direct current saturation of reactors 77 and 82 respectively.

Reactors 77 and 82 each have alternating current windings 76 and 81 and direct current windings, 78 and 83 respectively. Their construction is such that at zero saturating current the alternating current winding impedance is at its maximum, while maximum saturating current results in minimum impedance of the alternating current winding.

The transformer 21 is supplied from a line voltage which fluctuates in magnitude. The secondary 22 of transformer 21 has taps 74 and 75 providing voltage magnitudes $E_1$ and $E_2$. The control circuitry load voltage, E, is determined by the direct current saturating currents in reactors 77 and 82. By saturating reactor 77, the voltage $E_1$ may be applied to the load. By removing saturation from reactor 77 and saturating reactor 82, the voltage $E_2$ may be applied to the load. With fluctuating line voltage a regulating action is obtainable by adjustment of the saturating currents.

Successful action of the regulator is dependent upon proper control of saturating currents to reactors 77 and 82, which is achieved by the use of the two amplistat reactors, 85 and 87. Amplistats 85 and 87 are similar and each includes a saturable core reactor, signal control and bias windings, and rectifying devices in the input and output circuits. The several windings link one or more laminated iron cores. The amplistats differ from conventional transformers in that the cores are designed to be operated in the region of magnetic saturation during part of each cycle. A more detailed explanation of the amplistat is readily found in the literature, for example, the book Magnetic Amplifiers by Dr. H. F. Storm, published in 1954–5 by Wiley Publishing Company. Amplistats 85 and 87 have control windings 84 and 86, bias windings 103 and 95, and signal windings 101 and 94 respectively. The control windings 84 and 86 are coupled through rectifiers 96 and 97 to secondary 22. Bias windings 103 and 95 are supplied from a bias source 89 of any suitable design through a variable resistor 90. Bias winding 95 is coupled such that current flow produces a positive bias. The input to signal winding 94 of amplistat 87 is obtained from the output junction of the saturable reactors 77 and 82, rectified in balanced rectifier 88, fed through a filter circuit comprising inductance 91, capacitance 92, and variable resistor 93 to signal winding 94. The input signal reactively couples to the controlled winding 86. Rectifiers 96 and 97 in control winding 86 may be selenium or germanium crystals and are placed in the winding such that the output of amplistat 87 is a direct current flowing always in the same direction. The output of amplistat 87 is fed to the current winding 83 of reactor 82 to control the saturation and thus the impedance of reactor 82.

The input to signal winding 101 of amplistat 85 is taken across resistor 98 in the output circuit of amplistat 87. The magnitude of the input current to signal winding 101 is therefore proportional to the output of amplistat 87. Bias winding 103 is coupled such that current flow produces a negative bias which prevents the input signal from affecting the control windings 84 until the signal level overcomes the bias voltage. A high signal level output from amplistat 87 caused by a positive bias 95 and a low-signal level input to signal winding 94 causes an increased current in winding 84 of amplistat 85. The output current from winding 84 tends to saturate reactor 77 and to lower the impedance of said reactor, thus providing voltage $E_1$ to the ignitor circuitry. Should reactor 82 be saturated voltage $E_2$ is supplied to the ignitor circuitry. The amplistat and saturable reactor circuits thus tend to maintain a constant voltage output.

Reactors 77 and 82 introduce a phase shift in the output voltage E. The phase shift is affected by the impedance values of reactors 77 and 82, the magnitude and power factor of the load, and the voltages $E_1$ and $E_2$. The circuit constants are selected to produce a practical design having phase angles of 10° or less between input and output voltages.

The principal function of the ignitor circuits and the grid circuits is to establish conditions which are favorable to anode current flow. Each of the ignitor circuits are similar; hence, only ignitor circuit 24 will be described in detail. Circuit 24 is energized from the sine wave voltage supplied from the voltage regulator 23 and it is essentially a voltage peaking circuit. Circuit 24 consists of a serially coupled linear reactor 111, having variable taps of adjusting the voltage phase, a shunt coupled compensating circuit comprising an inductance 112 and a capacitor 113, a serially coupled linear reactor 114, a capacitor 115 coupled in shunt, a serially coupled linear reactor 116 having variable taps for adjusting the voltage magnitude, and non-linear firing reactor 117 serially coupled to the primary 26 of transformer 27 which then inductively couples to the respective ignitors.

Firing reactor 117 is constructed so that the volt ampere characteristic changes abruptly at its saturation point. At voltages below the saturation level, its impedance is very high. At voltages falling above the saturation points, its impedance is very low. The ignitor firing pulses are produced by discharge of the firing capacitor 115 which is charged through the reactor 114. Little current will flow in the reactor 117 until the capacitor 115 voltage is sufficiently large to saturate reactor 117 to produce the ignitor firing pulse. At the conclusion of the pulse, the capacitor 115 voltage has been reversed and the reactor 117 is unsaturated. The sequence is repeated on the next half cycle. Two firing pulses of opposite polarity are thus produced for each cycle of the supply voltage. The firing pulse width is determined by the impedances of the discharge components 116 and 117. The linear reactor 116 is placed in series with the reactor 117 to increase the pulse width to 30°. A tap on this reactor provides a means of reducing the pulse width and increasing the crest discharge current. Reactor 111, inductance 112, and capacitance 113 provide a phase shift function. The ignitor firing pulse must occur at a time when the anode voltage of the ignitron becomes positive and this time is selected by proper choice of reactor 111 impedance which has taps to provide for small adjustments of ignitor firing time. A similar type of ignitor circuit and a particularly satisfactory species is illustrated and has been described and claimed in Patent No. 2,362,294 issued to A. H. Mittag and assigned to the assignee of the present application. The pulsed output of ignitor circuit 24 is coupled through the ignitor coupling transformer 27 which has a primary winding 26 and dual secondary windings 28 and 29. Secondary 28 is coupled to ignitor 47 and secondary 29 is coupled to ignitor 56. Ignitrons 41 and 42 are operative on alternate halves of an alternating current cycle and thus provide full wave rectification. Transformer 27 also serves as an insulation line between the ignitor firing circuit components and the ignitron rectifier tubes.

Rectifiers 118 and 122 coupled in series to windings 28 and 29 respectively provide separation of the opposite polarity ignitor pulses so that only one pulse is applied to each ignitron during a period of one cycle. One firing circuit thus provides firing pulses for the two tubes which fire substantially 180° apart in time. The blocking action of rectifiers 118 and 122 also protects the ignitrons from damage by reverse current flow.

In Figure 3, primary 127 of transformer 128 obtains an unregulated voltage from tap 73 of secondary 22. Secondary windings 131 and 132 of transformer 128 couple to grid circuits 31 and 32 respectively. Since the grid circuits are similar, a description of grid circuit 31 is believed sufficient. Each ignitron has a separate grid circuit.

Grid circuit 31 supplies the correct potentials to the grids of ignitron 41 during the firing cycle. The voltage pulse for firing ignitor 47 and energizing the grids is obtained from the ignitor firing circuit 24 as mentioned hereinabove. A low ohmage resistor 121 is connected in series with the ignitor 47. In the event ignitor 47 is energized and a cathode spot is formed on the mercury pool 48, a current will flow in resistor 121 circuit. The voltage across the resistor is inductively coupled through transformer 144 to the shield grid 45. The shield grid 45 will then become positive and current will flow through the secondary circuit 146 of transformer 144 as well as through the primary 148 of a second transformer 147. This current flow develops a voltage across transformer 147 which is coupled to secondary winding 151 and applied to the control grid 46. This voltage is applied in series with a fixed negative bias obtained across balanced rectifying device 133 and resistor 138 and capacitor 141 and is of sufficient magnitude to make the control grid positive and to initiate current flow in ignitron 41.

The grid circuit thus incorporates a "permissive" feature which prevents application of positive voltage to the control grid 46 unless a cathode spot has been initiated. If no spot exists, the shield grid 45 cannot conduct and no positive voltage will be applied to the control grid 46.

A bias voltage for control grid 46 is developed across resistors 154 and capacitor 155. Similarly a bias voltage for shield grid 45 is developed across resistor 156 and capacitor 157.

A neon lamp 142 is associated with each tube for indicating misfires, or failure of the ignitor to start a cathode spot. This lamp is energized from the voltage across secondary winding 151. The lamp will normally light on each grid firing pulse with a flicker rate of approximately 25 cycles. During a misfire, the shield grid 45 will not conduct current, no voltage will appear on the secondary winding 151 and the neon lamp 142 will fail to light. Misfires of one cycle duration can readily be detected by observation of the lamp.

The function of the arc suppression circuit 71 is to limit the duration of fault current resulting from ignitron arc back on the rectifier, and its action is dependent upon arc-back sensing elements in circuit 71 which deliver a trip signal when one or more ignitrons conduct in the reverse direction (arc back condition).

The arc-back sensing circuitry is shown in Figure 3. There is an arc-back sensing circuit associated with each ignitron and each of the circuits is similar, therefore only the circuit associated with ignitron 42 will be described in detail. Current through ignitron 42 flows through the one turn primary 61 of current transformer 62. Secondary 70 of transformer 62 is coupled to a direct current source 171 which develops a current flow which saturates the transformer core such that the normal direction of ignitron current can produce little flux change. An ignitron arc back, fault, or reverse in current occurring in ignitron 42 opposes the saturating current ampere turns and tends to reduce the core flux to zero and drive it to saturation in the opposing sense. The large flux change resulting from arc back produces a voltage in the secondary 70 which is applied to the trip coil 173 of high speed relay 174. Thus transformer 62 discriminates between forward and reverse ignitron currents and provides a voltage pulse when arc back occurs.

The saturating current from source 171 flows through a resistor 168, an inductance 167, and the secondary windings of the twelve current transformers. Resistor 168 provides a means of adjusting the saturating current. Series inductances 167 has a large alternating current impedance as compared with the trip coil circuit. The pulse of voltage derived from an arc back will thus force current through the trip coil in preference to the supply circuit 171.

The voltage which normally appears across the twelve current transformers consists of a small IR drop produced by the saturating current and a small steady state ripple resulting from normal rectifier load current flow in the ignitron tubes. The leading voltage pulse produced during arc back is opposite in polarity to the IR drop and is much larger than the steady state ripple or the direct current IR drop. The magnitude of arc back current in an ignitron is dependent upon the alternating current system reactance and varies over a wide range. The various levels of arc back current tend to produce wide variations in the voltage amplitude and duration in the secondary windings of the current transformers. A thyrite resistor 172 is placed across the secondary of each current transformer to exert a non-linear loading effect on the current transformer secondary. Its effect is to increase the pulse duration and limit its crest magnitude. The loading effect is more pronounced during high current arc backs which tend to produce short duration high voltage pulses. The thyrite 172 thus tends to made the secondary 70 voltage pulse of constant amplitude and duration and to increase the degree of discrimination between normal and arc back conditions.

A circuit to operate a counter is associated with each current transformer. Each of the circuits is similar, hence only one circuit is shown and described. The counter is operated from each current transformer secondary voltage obtained during arc back. The current transformer secondary voltage charges a capacitor 162 through a rectifier 158, such as a copper oxide or germanium rectifier. The capacitor 161 then discharges through the counter coil 163 and provides a current pulse of sufficient duration to operate the counter 166.

Relay 174 is of conventional design and is, per se, not a part of this invention, hence only its functional operation with relation to the rest of the circuit will be described. Contact points 175 of relay 174 are coupled in series between secondary 16 and the load 59, and are normally closed if all the ignitrons are operating properly. Should an arc-back occur in one of the ignitrons the relay 174 would be tripped. Relay 174 is a high speed device which operates on a flux shifting principle. It has a holding coil 176 through which a direct current, from a source not shown, continuously flows and a trip coil 173 to which the trip voltage is applied. The polarities of holding and trip coils must be properly related if the relay is to operate properly. An arc-back current reverses the polarity relation causing relay 174 to be tripped, disconnecting contact points 175, and interrupting the current path to the load 59.

Figure 4:
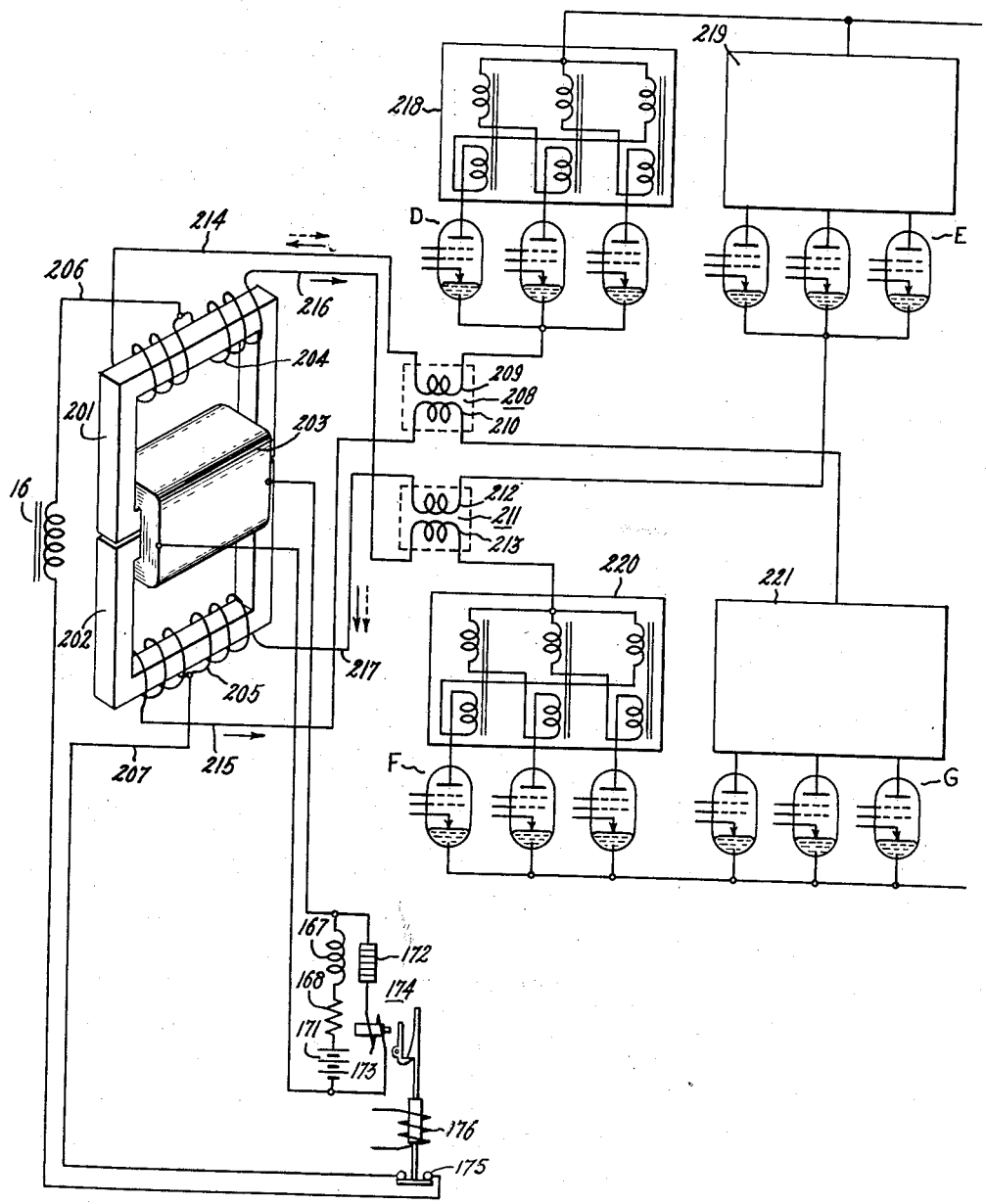
Figure 4 is a diagram of another embodiment of arc-suppression circuit that can be used in the system of this invention.

A second embodiment of the arc suppression circuit is shown in Figure 4. I have found it convenient in this embodiment to divide the valves into four groups D, E, F and G respectively, each of the groups comprising three valves each. Current transformers 201 and 202 which are not magnetically coupled have a common secondary winding 203 which links both transformer cores. A direct current through winding 203 effects saturation of both cores. Lead 206 couples to transformer 201 at the center of primary winding 204 which is wound around one leg of transformer 201 core. On one side of the center of winding 204, the winding is in a clockwise direction, and the winding to the other side of center is wound in a counter clockwise direction. Lead 207 and primary winding 205 couple similar to transformer 202. One end of winding 204 couples through winding 207 of cross reactor 208 to the cathodes of the ignitrons of valve group D. The other side of winding 204 couples through winding 213 of cross reactor 211 to the anodes of valve group F. Winding 205 couples similarly through winding 212 of cross reactor 211 and through winding 210 of cross reactor 208 to valve groups E and G respectively. The normal direction of rectifier current through the ignitron valves produces a flux aiding that produced by the direct saturating current of winding 203. An arc-back results in a fault current passing through one lead in each of the current transformers with the fault current being in a reverse direction in one of the current transformers. This action produces a change of flux in one current transformer core and a voltage across the current transformer secondary winding. The other current transformer remains saturated and hence does not influence the voltage pulse obtained across the current transformer secondary.

During normal operation, current flows for approximately one half cycle through groups D and G when the instantaneous polarity of winding 16 is as shown. Upon reversal of the polarity of 16, the current will transfer to tube groups E and F for the next half cycle interval. The current groups D, E, F and G will result in current directions in leads 214, 215, 216 and 217 as shown by the solid arrows.

Should an arc-back occur in group D, a fault current will start to flow when the polarity of winding 16 changes from that shown. The path of current flow will include winding 204, valve group D, valve group E and winding 205.

The direction of fault currents in leads 214 and 217 is indicated by the dotted arrows. Because the current in lead 214 flows in a direction which is reverse to the normal, a flux is produced in winding 204 which bucks the flux produced by the direct current winding 203 causing the core of 201 to become unsaturated. This large flux change resulting from an arc-back induces a voltage in secondary 203. This voltage is applied to the trip coil 173 of high-speed relay 174 which disconnects contact points 175 and interrupts the fault current flowing to the rectifier valves from secondary 16. The core of transformer 202 remains saturated since the fault current in lead 217 is in the same direction as during normal operation. The embodiment of Figure 4 provides a reduction in the number of components required for the arc suppression unit and a consequent reduction in overall cost.

The anode dividing reactors 218, 219, 220 and 221 and the cross commutation reactors 208 and 211 are not functionally related to the protective system. The dividing reactors provide a voltage which assists in pick up and current division in the late starting valves in each group of three. The cross commutation reactors force two groups which commutate at the same time such as D and G, to commutate at the same rate. This insures that groups C and D cease conduction at the same time.

Although the present invention has been illustrated by specific examples, it will be obvious to those skilled in the art that modifications may be made without departing from the spirit thereof.

What I claim as new and desire to secure by Letters Patent of the United States is:

1. In combination, an alternating current circuit, a direct current load circuit, electron rectifying apparatus coupled between said circuits and comprising an electron discharge device of the ignitron type having a plurality of grid electrodes, voltage regulating means and pulse forming means coupled to energize said ignitron, means interlocking said grid electrodes to establish predetermined grid firing pulses on each said grid electrodes, relay means adapted to electrically decouple said ignitron from said alternating current circuit for thereby interrupting ignitron firing current and simultaneously removing said grid firing pulses from said grid electrodes and establishing a steady state bias potential on said grid electrodes in the event of arc-back in said ignitron, and means for registering said arc-back.

2. In combination, an alternating current circuit, a direct current load circuit, electron rectifying apparatus coupled between said circuits comprising an electron discharge device of the type employing a liquid cathode and comprising an anode, a control electrode, a shield electrode associated with said cathode, and means for establishing electron emission at said cathode, an excitation circuit for said shield electrode, means for establishing a path for electron emission from said cathode, and means including said shield electrode circuit and said path of electron emission from said cathode for impressing said source of voltage upon said control electrode for controlling the conduction between said anode and said cathode.

3. In combination, an alternating current circuit, a direct current load circuit, electron rectifying apparatus coupled between said circuits and comprising an electron discharge device of the type employing an ionizable medium capable of supporting an arc discharge and including an anode, an ignitor member associated with said ionizable medium, a control electrode, and a shield electrode associated with said ionizable medium, voltage pulse forming means coupled to said ignitor for causing ionization of said medium and for establishing an ignition spot thereon, means coupled to said shield and said control electrodes for establishing current flow in said discharge device only upon establishment of said ignitron spot, relay means adapted to decouple said electron discharge device from said alternating current circuit in the event of excessive reverse current, and means for registering the event of said excessive reverse current.

4. In combination, an alternating current circuit, a direct current load circuit, electron rectifying apparatus coupled between said circuits and comprising an electron discharge device of the type employing a liquid cathode capable of supporting an arc discharge and including an anode, an ignitor member associated with said cathode, a shield electrode and a control electrode interposed between said anode and said cathode for determining conduction of said electron discharge device, a source of excitation, means coupled to said source for supplying current to said ignitor member for establishing an ignition spot on said cathode, means coupled to said source for energizing said shield electrode in dependence upon the flow of current between said shield electrode and said ignition spot, means intercoupling said shield electrode and said control electrode for establishing a potential on said control electrode sufficient to cause conduction between said anode and cathode.

5. In a circuit of the type comprising a power source and a circuit load, a voltage regulating system comprising at least two saturable core reactors, each of said reactors having at least one alternating current coil and one direct current coil wound on a magnetic core, said alternating current coils being serially connected one to the other and coupled between the junction point of said alternating current coils and said source, and amplifying means connected to said direct current coils and responsive to the magnitude of the load current for controlling the absolute saturation of said cores.

6. A voltage regulating circuit adapted for use with an alternating current source, comprising at least two saturable core reactors, each of said reactors having an alternating current coil and a direct current coil wound on a magnetic core, said alternating current coils serially coupled to each other, said alternating current coils coupled across a portion of said source, a circuit load coupled to the junction point of said alternating current coils, means responsive to the magnitude of the load voltage for controlling the absolute saturation of said saturable core reactors, said means comprising first and second amplistat reactors for establishing a reference degree of saturation of said core reactors, each of said amplistat reactors including a control winding, a bias winding, and a signal winding, means to provide a direct current signal to said first amplistat of an amplitude related to the load voltage, the output side of said first amplistat coupled to one of said core reactors, said first amplistat having a portion of its output coupled to said second amplistat as a signal voltage, a direct current voltage source coupled to the bias windings of said amplistats, the bias winding of said first amplistat being coupled such that the bias voltage is additive to said signal input, the bias winding of said second amplistat being coupled such that the bias voltage is subtractive to said input signal, the output terminal of said second amplistat coupled to said second core reactor such that the impedance of said reactor is related to the saturation of said core reactor, and that the voltage coupled to said load is regulated by the impedance of said two core reactors.

7. In combination, an electron discharge device of the type employing an ionizable medium cathode capable of supporting an arc discharge and including an anode, an arc initiating member, a shield electrode disposed in the region of said cathode, and a control electrode interposed between said anode and cathode for controlling the conduction of said discharge device, means for energizing said arc initiating member to establish a source of ionization at said cathode, means providing a bias voltage to said shield and control electrodes, means intercoupling said arc initiating member to said shield electrode and to said control electrode, and means for energizing said control electrode only upon the establishment of an arc discharge at said cathode.

8. In combination, an alternating current circuit, an electric discharge device coupled to said alternating current circuit, said electron discharge device being of the type employing an ionizable medium cathode capable of supporting an arc discharge and including an anode, an arc initiating member, a control electrode disposed in the region of said cathode, and a shield electrode interposed between said anode and cathode for determining conduction of said discharge device, means controlling said arc initiating member to establish a source of ionization at said cathode, bias means coupled to said shield electrode, a transformer having one winding connected in series relation with said shield electrode and a second winding inductively coupling to said control electrode, and means energizing said control electrode only upon the establishment of a source of ionization at said cathode and the removal of said bias from said shield electrode.

9. In combination, an alternating current circuit, a direct current circuit, electrical rectifying apparatus coupled between said circuits comprising an electric discharge device of the type employing an ionizable medium capable of supporting an arc discharge and including an anode, a cathode, and ignitor control member associated with said cathode, a control electron interposed between said anode and said cathode, a shield electrode interposed between said control electrode and said cathode, means coupled to said ignitor control member for causing ionization of said medium and for establishing an ignition spot on said cathode, an excitation circuit coupled to said shield electrode for establishing current flow therein only upon establishment of said ignition spot on said cathode, an interlocking excitation circuit for said control electrode and said shield electrode for establishing a potential on said control electrode sufficient to cause conduction between said anode and cathode only upon establishment of current flow in the excitation circuit of said shield electrode.

10. In an electron discharge device of the type having an ionizable medium capable of supporting an arc discharge and including an anode, an ignitor control member associated with said cathode, a shield electrode, and a control electrode interposed between said anode and said cathode, a source of excitation voltage, circuit means coupling said voltage source to said ignitor for effecting formation of an ignition spot on said cathode, circuit means coupling said source to said shield electrode, an impedance element coupled in said ignitor circuit, a transformer having a primary coupled across said impedance element, a second transformer having a primary winding serially coupled to the secondary of said first transformer and to said shielding electrode to provide a positive voltage to said electrode upon the formation of a cathode spot, a neon lamp coupled across the secondary of said second transformer to provide an indication when said secondary of said second transformer is energized.

11. An electron discharge device employing an ionizable medium cathode capable of supporting an arc discharge and comprising an anode, an ignitor member associated with said cathode, a shield electrode disposed in the region of said cathode, and a control electrode interposed between said anode and cathode for determining the instant of conduction of said discharge device, means associated with said ignitor member for establishing an ignition spot on said cathode, a first transformer having a primary winding serially coupled to said ignitor, said first transformer having a secondary winding serially coupled to said shield electrode, a second transformer having a primary winding serially coupled to said secondary of said first transformer and to said shield electrode, said second transformer having a secondary winding serially coupled to said control electrode, the primary of said first transformer adapted to be energized by current flow in said ignitor member, the primary of said first transformer inductively coupling to the secondary of said first transformer, the secondary of said first transformer and to said control electrode whereby said control electrode is energized to initiate cathode to anode current flow.

12. In an electron discharge device of the type employing an ionizable medium cathode capable of supporting an arc discharge and including an anode, an ignitor, a control electrode interposed between said cathode and said anode, a shield electrode, a source of excitation voltage, means coupling said source of excitation voltage to said ignitor for effecting the formation of an ignition spot on said cathode, means inter-coupling said control electrode and said shield electrode for establishing current flow in said discharge device only upon establishment of said ignition spot on said cathode, said means including a peaking transformer having a secondary winding coupled in a series circuit to said shield electrode, an impedance element serially coupled in said circuit, a first transformer having a primary and a secondary winding, the primary of said first transformer coupled across said impedance element, a second transformer having primary and secondary windings, said primary of said second transformer serially coupled to the secondary winding of said first transformer, the secondary of said second transformer serially coupled to said control electrode, means coupling a bias voltage to said control and shield electrodes, the primary of said first transformer being energized by current flow in said impedance element, the secondary of said first transformer energized by the primary of said second transformer coupled such that a positive voltage is impressed on said shield electrode, said primary of said second transformer being energized by the voltage applied on the secondary of said first transformer, the primary of said second transformer energizing the secondary of said first transformer the secondary of impressing a positive voltage on said control grid to determine conduction of said discharge device.

13. In combination, an ignitron having an anode and a mercury pool cathode, means for initiating and maintaining current flow in said ignitron, an arc back suppression circuit comprising a transformer having a primary winding serially coupled to said anode, and a secondary winding inductively coupled to said primary winding such that current in said ignitron saturates said secondary winding in a given polar direction, a non-linear resistance, a relay trip coil serially coupled to said resistance, impedance elements, a power source coupled in series to said impedance elements and to said secondary winding, said coil and said resistance coupled in parallel to said source and said impedance elements, a relay maintained in position by a field developed by current flow in said trip coil, said trip coil being released when said field is weakened by a fault current flowing in a direction reversed to the normal and said coil being adjusted such that the relay remains closed only when said current induced in said secondary coil and said current developed by said voltage source flow in the same direction.

14. In a rectifying system employing ignitron valves, a protective circuit for preventing current flow in a reverse direction in said ignitron comprising two transformers each having primary windings coupled to said ignitrons, secondary windings, and magnetic cores, each of said primary windings being center tapped and having the winding to one side of center wound in a clockwise direction and the winding to the other side of center wound in a counter clockwise direction, said primary windings disposed around a leg of a respective magnetic core, said transformers having a common secondary winding disposed around a leg of each of said magnetic cores, a direct current source, said secondary windings adapted to have a current flow produced by said source for the purpose of having a field having lines of force oriented in a predetermined polar direction, said primary windings coupled such that normal current flow therein develops a field having lines of force oriented to aid the field developed by current flow in said secondary and reverse current flow therein develops a field which bucks the field developed by said direct current source said magnetic core being saturated by said fields, said secondary winding coupled to a relay trip coil, said trip coil adapted to be held in position during saturation of said secondary winding, and said trip coil adapted to be released by the voltage developed across secondary winding when said secondary winding is de-saturated due to reverse current flow in said primary.

15. In combination, an electron discharge device of the type having an ionizable medium cathode capable of supporting an arc discharge and including an anode, an ignitor control member associated with said cathode to initiate normal anode to cathode current in said discharge device, means for preventing reverse current in said discharge device comprising, a current transformer having a primary and a secondary winding, said primary winding serially coupled to said anode, a non-linear resistance, a relay trip coil serially coupled to said resistance, impedance elements, a power source coupled in series to said impedance elements and to said secondary winding, said coil and said resistance coupled in parallel to said source and said impedance elements, said secondary winding adapted to be saturated by current developed by said power source and normal current flow through said electron discharge device, said secondary windings adapted to be de-saturated by reverse current flow in said electron discharge, said trip coil adapted to be de-energized by de-saturation of said secondary winding, and said relay adapted to be opened when said coil is de-energized.

References Cited in the file of this patent

UNITED STATES PATENTS

| | | |
|---|---|---|
| 2,169,866 | Bedford | Aug. 15, 1939 |
| 2,186,239 | Finch | Jan. 9, 1940 |
| 2,427,450 | Durand | Sept. 16, 1947 |
| 2,441,484 | Goldstein | May 11, 1948 |
| 2,678,418 | Black | May 11, 1954 |